US008511047B2

(12) United States Patent
Mahon et al.

(10) Patent No.: US 8,511,047 B2
(45) Date of Patent: Aug. 20, 2013

(54) DEVICE FOR MIXING AND DISPENSING FLUIDS

(75) Inventors: William J. Mahon, Southbury, CT (US); Gary R. Dye, Oxford, CT (US); Robert D. Wheeler, Fairfield, CT (US); Michael R. Sandner, Newtown, CT (US); Henry Ruddy, Sandy Hook, CT (US); John J. Corrigan, III, Washington, CT (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 1240 days.

(21) Appl. No.: 11/890,697

(22) Filed: Aug. 7, 2007

(65) Prior Publication Data
US 2009/0038270 A1 Feb. 12, 2009

(51) Int. Cl.
*B65B 9/02* (2006.01)

(52) U.S. Cl.
USPC .............................. 53/553; 53/428

(58) Field of Classification Search
USPC ................ 53/428, 553, 472, 554; 141/90, 141/91, 85, 89, 114, 166; 239/106, 112, 239/108; 222/148, 145, 190
See application file for complete search history.

(56) References Cited

U.S. PATENT DOCUMENTS

| | | | |
|---|---|---|---|
| 3,417,923 A * | 12/1968 | Carlson | 239/112 |
| 3,687,370 A | 8/1972 | Sperry | |
| 3,945,569 A | 3/1976 | Sperry | |
| 4,522,789 A | 6/1985 | Kelly et al. | |
| 4,765,513 A | 8/1988 | McMillin et al. | |
| 4,800,708 A | 1/1989 | Sperry | |
| 4,854,109 A | 8/1989 | Pinarer et al. | |
| 4,986,667 A | 1/1991 | Berger | |
| 5,072,859 A | 12/1991 | Wiley et al. | |
| 5,086,949 A | 2/1992 | Vulpitta et al. | |
| 5,211,311 A | 5/1993 | Petcen | |
| 5,255,847 A * | 10/1993 | Sperry et al. | 239/112 |
| 5,376,219 A | 12/1994 | Sperry et al. | |
| 5,776,510 A * | 7/1998 | Reichental et al. | 425/112 |
| 6,003,288 A | 12/1999 | Sperry et al. | |
| 6,033,104 A | 3/2000 | Althausen | |
| 6,034,197 A | 3/2000 | Mahon et al. | |
| 6,148,874 A * | 11/2000 | Rutter et al. | 141/10 |
| 6,283,174 B1 | 9/2001 | Sperry et al. | |
| 6,550,229 B2 | 4/2003 | Sperry et al. | |
| 6,793,098 B2 | 9/2004 | Huber et al. | |
| 6,929,193 B2 | 8/2005 | Ruddy | |
| 6,996,956 B2 | 2/2006 | Sperry et al. | |
| 2002/0092278 A1 | 7/2002 | Sperry et al. | |
| 2008/0002519 A1 | 1/2008 | Soechtig et al. | |

FOREIGN PATENT DOCUMENTS

| | | |
|---|---|---|
| DE | 2029719 | 12/1971 |
| DE | 0025094 A | 3/1981 |
| DE | 4335898 A1 | 4/1995 |

* cited by examiner

*Primary Examiner* — Sameh H. Tawfik
(74) *Attorney, Agent, or Firm* — Thomas C. Lagaly

(57) ABSTRACT

One aspect of the invention pertains to a device for mixing and dispensing fluids, which generally includes a housing; a mixing chamber having a first inlet for introducing a first fluid into the mixing chamber, a second inlet for introducing a second fluid into the mixing chamber, and an outlet through which fluid may exit the mixing chamber; and a valving rod received within the mixing chamber and movable between an open position, in which the first and second inlets are in fluid communication with the mixing chamber, a cleaning position, in which the valving rod substantially seals closed the first inlet but does not seal closed the second inlet, and a closed position, in which the valving rod substantially seals closed the first and second inlets.

9 Claims, 10 Drawing Sheets

DEVICE FOR MIXING AND DISPENSING FLUIDS

BACKGROUND OF THE INVENTION

The present invention pertains generally to fluid dispensers and related apparatus used to produce foam-in-place packaging cushions and, more particularly, to an improved system for preventing such dispensers from occluding due to build-up and/or hardening of fluid within the dispenser, without the need for a cleaning solvent.

The invention finds particularly utility in the field of foam-in-place packaging, which is a highly useful technique for on-demand protection of packaged objects. In its most basic form, foam-in-place packaging comprises injecting foamable compositions from a dispenser into a container that holds an object to be cushioned. Typically, a plastic film is used as a barrier between the object and the rising (expanding) foam and as a liner between the foam and its container (e.g., a corrugated box). As the foam rises, it expands into the remaining space between the object and the container, thus forming a custom cushion for the object.

A common foamable composition is formed by mixing an isocyanate compound with a hydroxyl-containing material, such as a polyol (i.e., a compound that contains multiple hydroxyl groups), typically in the presence of water and a catalyst. The isocyanate and polyol precursors react to form polyurethane. At the same time, the water reacts with the isocyanate compound to produce carbon dioxide. The carbon dioxide causes the polyurethane to expand into a foamed cellular structure, i.e., a polyurethane foam, which serves to protect the packaged object.

In other types of foam-in-place packaging, an automated device produces flexible containers, e.g., in the form of bags, from flexible, plastic film and dispenses a foamable composition into the containers as the containers are being formed. As the composition expands into a foam within the container, the container is sealed shut and typically dropped into a box or carton holding the object to be cushioned. The rising foam again tends to expand into the available space, but does so inside the container. Because the containers are formed of flexible plastic, they form individual custom foam cushions around the packaged objects. Exemplary devices for automatically producing foam-in-place cushions in this manner are assigned to the assignee of the present invention, and are illustrated, for example, in U.S. Pat. Nos. 4,800,708, 4,854,109, 5,376,219, and 6,003,288, the contents of each of which are incorporated entirely herein by reference. Because such cushions enclose the foamable composition in bags, such packaging is commonly known as "foam-in-bag" packaging.

One difficulty with the foamable compositions used to make polyurethane foam for foam-in-place packaging is that the foam precursors and resultant foam tend to have somewhat adhesive properties. As a result, the foamable composition tends to stick to objects and then harden thereon into foam. This tendency is particularly problematic inside of the dispenser from which the foam precursors are ejected. As is known, the polyol and isocyanate foam precursors must be withheld from mixing with one another until just prior to injection. In the most common type of dispenser, the two foam precursors enter the dispenser, mix with one another in an internal chamber disposed within the dispenser to form a foamable composition, and then the resultant foamable composition exits the dispenser via a discharge outlet. As the dispenser operates over and over again, particularly in automated or successive fashion, foamable composition tends to build up in the internal mixing chamber and around the discharge outlet of the dispenser, harden into foam, and block the proper exiting of further foamable composition. As a result, the mixing chamber and discharge outlet must be frequently cleaned to ensure continued operation of the dispenser.

Conventionally, a solvent capable of dissolving both the foam precursors and the foamable composition prior to its fully cured state is used to clean foam-in-place dispensers. In order to clean the dispenser on an on-going basis without the necessity of frequent removal of the dispenser from the cushion-making device for manual cleaning and/or disassembly, the solvent is generally supplied to the discharge end of the dispenser from a separate source as disclosed, e.g., in U.S. Pat. Nos. 6,929,193 and 6,996,956, the disclosures of which are hereby incorporated herein by reference thereto.

While the use of a solvent in this manner has proven to be an effective cleaning technique, it adds to the operational expense and complexity of foam-in-place packaging systems, and is generally unfavorable from an environmental standpoint. In addition, excess solvent is generally allowed to flow from the dispenser and into next cushion to be formed, thereby avoiding the necessity of separate disposal of such excess solvent. While this works well in many applications, the solvent can leak through incomplete seals or vent holes in the bag or film containing the foam. Such solvent leakage can be detrimental to the surface appearance of certain types of packaged items, such as wood furniture.

Accordingly, a need exists in the art for an improved means for continually and automatically cleaning dispensers used in foam-in-place packaging, which obviates the need for a cleaning solvent.

SUMMARY OF THE INVENTION

That need is met by the present invention, which, in one aspect, pertains to a device for mixing and dispensing fluids, comprising:
  a. a housing;
  b. a mixing chamber in the housing, the mixing chamber comprising
    (1) a first inlet for introducing a first fluid into the mixing chamber,
    (2) a second inlet for introducing a second fluid into the mixing chamber, and
    (3) an outlet through which fluid may exit the mixing chamber;
and
  c. a valving rod received within the mixing chamber and movable between
    (1) an open position, in which the first and second inlets are in fluid communication with the mixing chamber such that the first and second fluids may enter the mixing chamber, form a mixture therein, and exit the mixing chamber via the outlet,
    (2) a cleaning position, in which the valving rod (a) substantially seals closed the first inlet to substantially prevent the first fluid from entering the mixing chamber, but (b) does not seal closed the second inlet so that the second fluid may enter the mixing chamber, and
    (3) a closed position, in which the valving rod substantially seals closed the first and second inlets to substantially prevent the first and second fluids from entering the mixing chamber.

Another aspect of the present invention is directed to a system for mixing and dispensing fluids into a flexible container and enclosing the fluids within the container, comprising:

a. a mechanism that conveys a web of film along a path of travel;

b. a device as described above for mixing and dispensing fluids into the web; and c. one or more devices for sealing the web into a flexible container to enclose the fluids therein.

A further aspect of the present invention is directed to a method for mixing and dispensing fluids into a flexible container and enclosing the fluids within the container, comprising:

a. conveying a web of film along a path of travel;

b. mixing and dispensing fluids into the web from a device comprising:
(1) a housing;
(2) a mixing chamber in the housing, the mixing chamber comprising
(a) a first inlet for introducing a first fluid into the mixing chamber,
(b) a second inlet for introducing a second fluid into the mixing chamber, and
(c) an outlet through which fluid may exit the mixing chamber, and
(3) a valving rod movably received within the mixing chamber;

c. moving the valving rod between
(1) an open position, in which the first and second inlets are in fluid communication with the mixing chamber such that the first and second fluids enter the mixing chamber, form a mixture therein, exit the mixing chamber via the outlet, and flow into the web,
(2) a cleaning position, in which the valving rod (1) substantially seals closed the first inlet to substantially prevent the first fluid from entering the mixing chamber, but (2) does not seal closed the second inlet so that the second fluid continues to enter and flow through the mixing chamber, and
(3) a closed position, in which the valving rod substantially seals closed the first and second inlets to substantially prevent the first and second fluids from entering the mixing chamber; and d. sealing the web into a flexible container to enclose the fluids therein.

Still another aspect of the invention relates to a method for mixing fluids in a device comprising a mixing chamber having a first inlet for introducing a first fluid into the mixing chamber, a second inlet for introducing a second fluid into the mixing chamber, and an outlet, with a valving rod movably received within the mixing chamber, comprising:

a. moving the valving rod to an open position, in which the first and second inlets are in fluid communication with the mixing chamber such that the first and second fluids enter the mixing chamber, form a mixture therein, and exit the mixing chamber via the outlet;

b. moving the valving rod to a cleaning position, in which the valving rod (1) substantially seals closed the first inlet to substantially prevent the first fluid from entering the mixing chamber, but (2) does not seal closed the second inlet so that the second fluid continues to enter and flow through the mixing chamber; and c. moving the valving rod to a closed position, in which the valving rod substantially seals closed the first and second inlets to substantially prevent the first and second fluids from entering the mixing chamber.

A further aspect of the invention is directed to a method for mixing and dispensing fluids into a flexible container and enclosing the fluids within the container, comprising:

a. conveying a web of film along a path of travel;

b. supplying a first fluid to a mixing and dispensing device;

c. supplying a second fluid to the mixing and dispensing device, the device comprising
(1) a housing;
(2) a mixing chamber in the housing, the mixing chamber comprising
(a) a first inlet for introducing the first fluid into the mixing chamber,
(b) a second inlet for introducing the second fluid into the mixing chamber, and
(c) an outlet, and
(3) a valving rod movably received within the mixing chamber;

d. mixing the first and second fluids in the mixing and dispensing device by moving the valving rod to an open position, in which the first and second inlets are in fluid communication with the mixing chamber to allow the first and second fluids enter the mixing chamber and form a mixture therein;

e. dispensing the fluid mixture from the device and into the web via the outlet;

f. stopping the supply of the first fluid but continuing to supply the second fluid to the device so that the second fluid continues to enter the mixing chamber and exit the chamber via the outlet;

g. moving the valving rod to a closed position, in which the valving rod substantially seals closed the first and second inlets to substantially prevent the first and second fluids from entering the mixing chamber; and h. sealing the web into a flexible container to enclose the fluids therein.

These and other aspects and features of the invention may be better understood with reference to the following description and accompanying drawings.

DETAILED DESCRIPTION OF THE INVENTION

Figure 1:
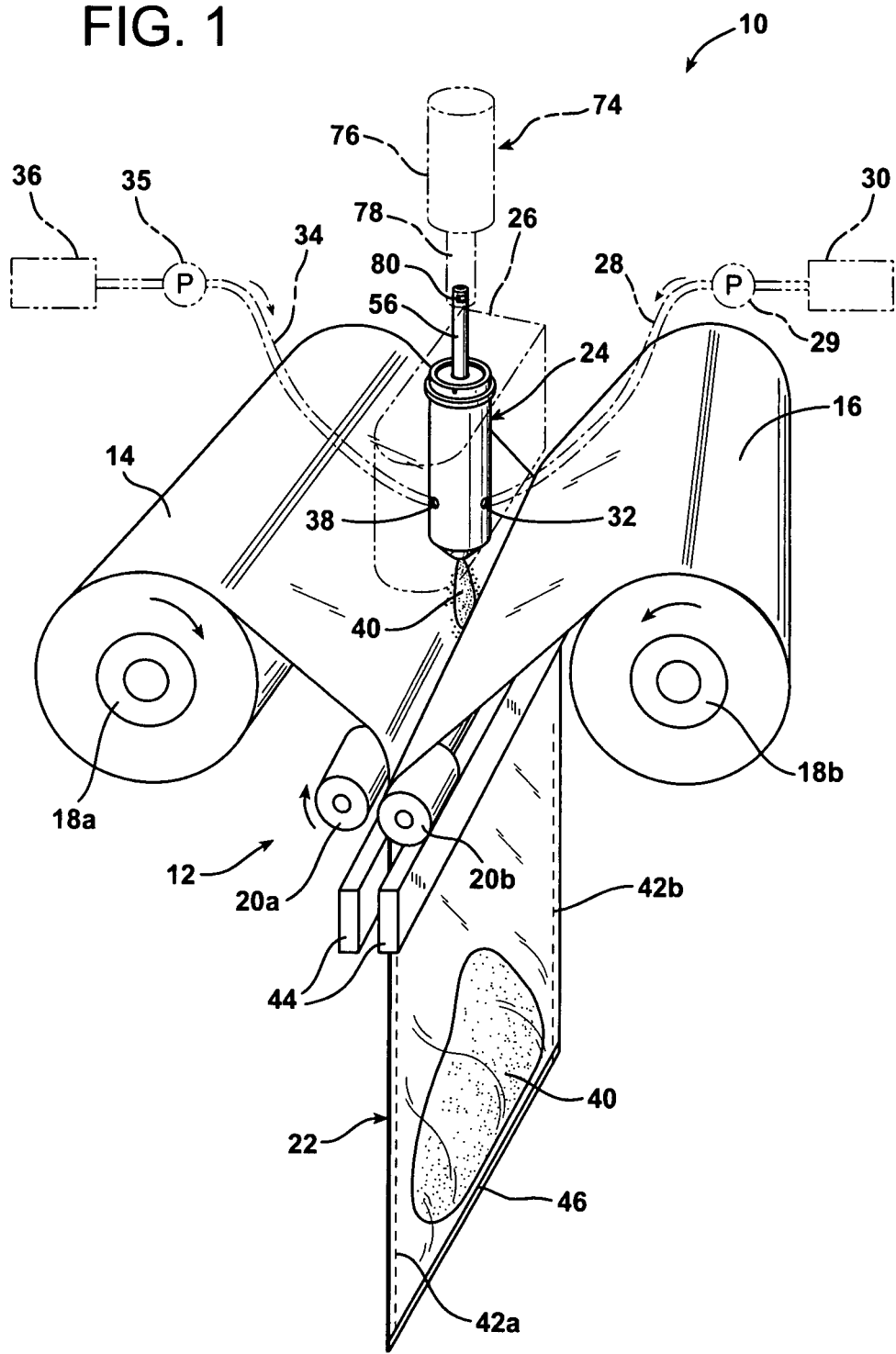
FIG. 1 is a perspective, schematic view of an apparatus and system in accordance with the present invention in which a dispenser introduces a foamable composition or other fluid product into a partially-formed flexible container as the container is being completed.

FIG. 1 shows a system 10 in accordance with the present invention for mixing and dispensing fluids into flexible containers and enclosing the fluid within the containers. System 10 comprises a mechanism, generally indicated at 12, that conveys a web of film, or in this case two webs of film 14 and 16, along a predetermined path of travel. Conveying mechanism 12 may include a pair of supply rolls 18a and 18b and a pair of nip rollers 20a and 20b. Film webs 14 and 16 are preferably supplied as wound rolls of film that may be supported on and unwound from respective supply rolls 18a, b. Nip rollers 20a, b rotate in opposing directions such that, when the films webs 14, 16 are passed therebetween, the rotation of the nip rollers causes the film webs to advance from supply rolls 18a, b. The nip rollers 20a, b are made to rotate in this manner by being mechanically or otherwise coupled to a suitable power source (not shown), e.g., an electric motor.

Film webs 14, 16 may comprise any flexible material that can be manipulated by system 10, e.g., various thermoplastic or fibrous materials such as polyethylene or paper. Preferably, film webs 14, 16 are flexible, thermoplastic films, and may be formed from any polymeric material capable of being formed into a foam-in-bag cushion as described herein. Non-limiting examples include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The film(s) may be monolayer or multilayer films and can be made by any known coextrusion process by melting the component polymer(s) and extruding or coextruding them through one or more flat or annular dies, or by lamination of two or more film layers.

Film webs 14, 16 may be joined together from two separate supply rolls as shown. Alternatively, a single film web having two juxtaposed film plies, which are pre-joined, e.g., along a 'center folded' longitudinal edge, may be employed. In this embodiment, only one web and one supply roll is used as disclosed, e.g., in U.S. Pat. Nos. 6,003,288 and 6,550,229, the disclosures of which are hereby incorporated herein by reference thereto.

The "travel path" referred to herein is the route that the film web, e.g., film webs 14, 16, traverses while being conveyed through system 10. Conveying mechanism 12, and specifically nip rollers 20a, b, cause the film webs 14, 16 to converge as two juxtaposed plies of film that define a partially-formed flexible container 22.

System 10 further includes a device 24 for mixing and dispensing fluids into the web, e.g., into the partially-formed flexible container 22 formed by webs 14, 16. Mixing and dispensing device 24, hereinafter referred to simply as the "dispenser" 24, may be positioned adjacent to (or partly in) the travel path of film webs 14, 16 such that it can dispense fluids in predetermined amounts into the partially-formed flexible container 22. This may be accomplished by providing a manifold 26 (shown in phantom for clarity) or similar device to maintain dispenser 24 in a desired position relative to the travel path of film webs 14, 16. As shown, one or both nip rollers 20a, b may have a reduced diameter adjacent to the position at which dispenser 24 dispenses fluid into the web to allow such fluid to pass between the nip rollers, with film webs 14, 16 being 'nipped' substantially only at the longitudinal edges thereof.

Manifold 26 may also be used to facilitate the connection to dispenser 24 of suitable piping, tubing, or other type of conduit to permit desired fluids to be transported to the dispenser. Many configurations are possible. As illustrated (again, in phantom for clarity), a conduit 28 from a first fluid source, shown schematically at 30, is connected to dispenser 24 via manifold 26 at first inlet port 32. Similarly, a conduit 34 from a second fluid source, shown schematically at 36, is also connected to dispenser 24 via manifold 26 at second inlet port 38. Respective pumps 29 and 35, or other suitable devices for causing fluid flow, may be used to facilitate the transfer of fluid from the first and second fluid sources 30 and 36, through the respective conduits 28 and 34, and into respective first and second inlet ports 32 and 38 of dispenser 24.

For foam-in-place or foam-in-bag packaging, dispenser 24 is preferably adapted to mix and dispense a foamable fluid comprising polyols, isocyanates, and mixtures of polyols and isocyanates. Thus, first fluid source 30 may comprise a first fluid comprising one or more isocyanates, and the second fluid source 36 may comprise a second fluid comprising one or more polyols. As will be explained in further detail below, dispenser 24 receives the polyols and isocyanates, allows the two components to mix into a foamable fluid mixture 40, and dispenses the mixture 40 into the partially-formed flexible container 22. The amount of such foamable fluid to be dispensed into each container 22 by dispenser 24 is predetermined, based on, e.g., the internal volume within the container, the degree to which the fluid expands as it forms into a foam, the amount of foam that is desired to be contained in each completed container/packaging cushion, etc. Such determination of the amount of fluid to be dispensed by dispenser 24 is commonly made by those having ordinary skill in the art to which this invention pertains.

The first fluid from first fluid source 30 may comprise one or more isocyanates as conventionally used in foam-in-place/foam-in-bag packaging. Such isocyanates are described, e.g., in U.S. Pat. No. 6,034,197, the disclosure of which is hereby incorporated herein by reference thereto. Similarly, the second fluid from second fluid source 36 may comprise one or more polyols as conventionally used in foam-in-place/foam-in-bag packaging, including any of the polyols, alone or blended, which are described in the above-incorporated U.S. Pat. No. 6,034,197. The second fluid may further include water and/or one or more catalysts, surfactants, compatibilizers, and/or other additives (e.g., fragrances, dyes, viscosity-control agents, etc.), as described in further detail in U.S. Pat. No. 6,034,197.

System 10 may further include one or more devices for sealing the web into a flexible container to enclose the fluids from dispenser 24 within such container. In the presently-illustrated embodiment, such sealing device(s) seal the webs of plastic film 14, 16 together to form and then complete container 22 to thereby enclose the foamable fluid mixture 40 therein. Any conventional web-sealing devices may used for this purpose. For example, in addition to conveying the film webs 14, 16 through system 10, nip rollers 20*a, b* may also serve a second function of producing longitudinal seals 42*a* and 42*b* on container 22. This may be accomplished via the application of sufficient heat by the nip rollers 20*a, b* to the two juxtaposed film plies 14, 16 to cause the longitudinal edges thereof to fuse together. Such a technique is well known, e.g., as described in the above-incorporated U.S. Pat. Nos. 6,003,288 and 6,550,229.

A severing and sealing mechanism 44 may also be provided to form transverse bottom and top seals 46 and 48, respectively, preferably by the application of sufficient heat and pressure to cause the films to fuse together across the entire width of the film webs. In a technique that is also well-known and described, e.g., in the above-incorporated U.S. Pat. No. 6,003,288, transverse bottom seal 46 is first formed then, as the film webs 14, 16 are advanced by nip rollers 20*a, b* (and also as longitudinal seals 42*a, b* are formed thereby), dispenser 24 dispenses fluid 40 into the partially-formed container 22 as the container is being formed. When a sufficient, predetermined amount of fluid mixture 40 has been added to the container and a sufficient amount (length) of the film webs 14, 16 have been withdrawn from supply rolls 18*a, b* to achieve a desired longitudinal length for container 22, severing and sealing mechanism 44 forms top transverse seal 48 (FIG. 2) to thereby seal the container closed and complete the partially-formed container 22, which becomes a completed flexible container 50, with foamable fluid composition 40 enclosed therein.

Figure 2:
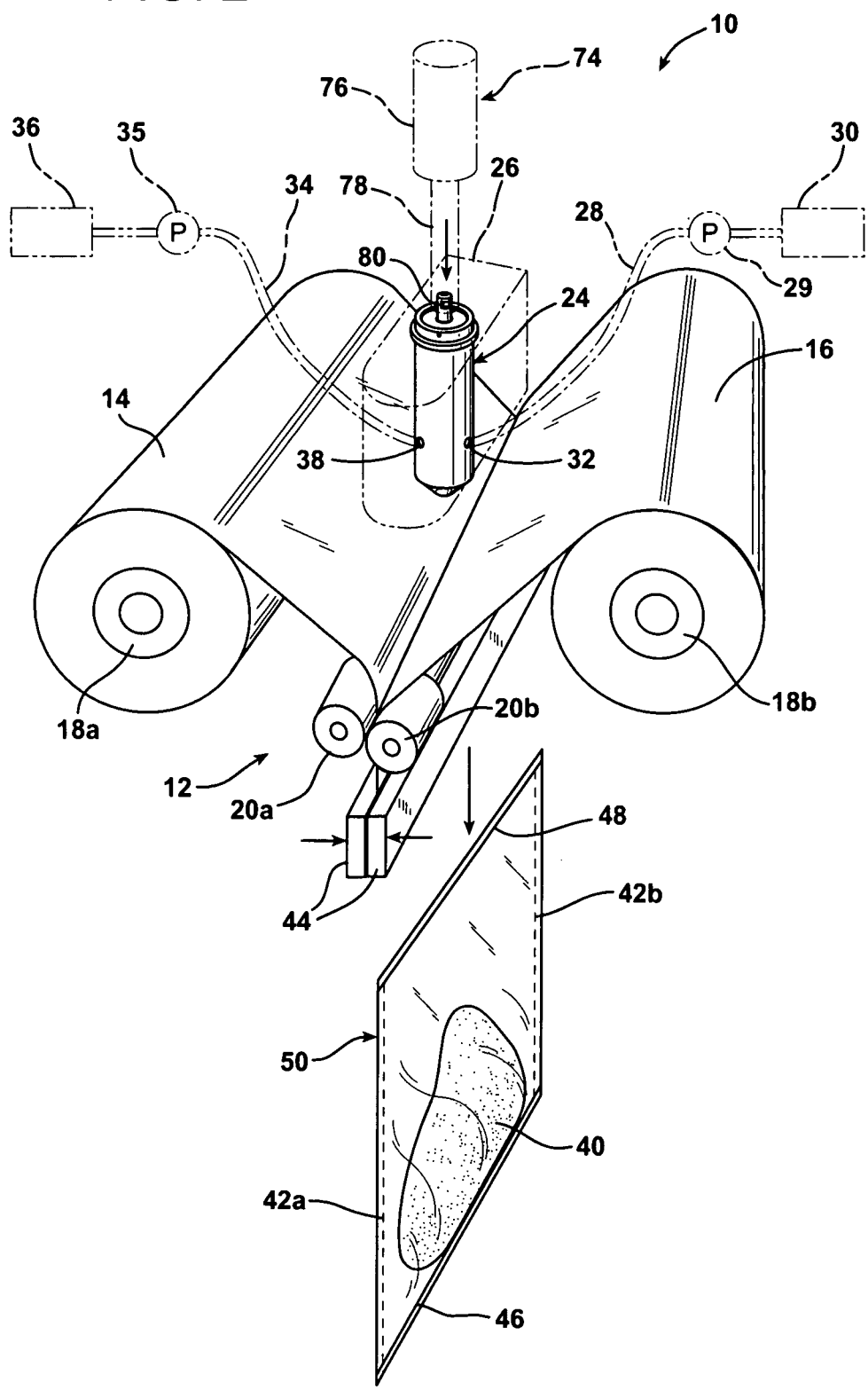
FIG. 2 is similar to FIG. 1, except that the container has been completed and severed from the film web, thereby enclosing the foamable composition therein.

Simultaneous with or just after the formation of top transverse seal 48, severing/sealing mechanism 44 severs the completed container 50 from film webs 14, 16, e.g., by applying sufficient heat to the film webs to melt completely through them such that the completed container 50 drops downwards by force of gravity from system 10 as shown in FIG. 2. The severing and sealing mechanism 44 may perform both functions, i.e., both the formation of transverse seals 46, 48 and the severing of completed container 50 from the film webs 14, 16, by including at least one wire (not shown) or other electrical resistance device on one or both halves of mechanism 44. Such wire or other device is heated sufficiently to melt through both of the juxtaposed films 14 and 16 when the wire is pressed into contact with the films, which can be done by causing both halves of the mechanism 44 to converge on the films and squeeze the films therebetween as indicated in FIG. 2. As such convergence occurs, a current may be sent through the wire, causing it to heat and melt through film webs 14, 16, thereby severing a completed container 50 from the film webs. At the same time, the heat from the wire causes the films to weld together both below and above the wire; the weld below the wire forms the transverse top seal 48 of the completed container 50 and the weld above the wire forms a transverse bottom seal as at 46 for the next container to be formed from film webs 14, 16.

Other techniques for forming transverse seals are possible, such as, e.g., employing two or more wires on one or both halves of the mechanism 44, with each wire performing a separate sealing or severing function. Exemplary foam-in-place and foam-in-bag packaging systems employing conveying, sealing, and severing mechanisms as described above are available from Sealed Air Corporation, the assignee of the present invention, and sold under the Instapak® trademark for foam packaging systems.

Various alternatives to the system 10 shown in FIGS. 1 and 2 may be employed to make flexible containers. For example, instead of using two separate webs of film to form containers as illustrated in the drawings, containers can be prepared from a center-folded film web as noted above and described in the above-incorporated U.S. Pat. No. 6,003,288. In such an embodiment, the fold provides one of the longitudinal edges of the container. The dispenser is inserted into and positioned within the center-folded web via the opposite longitudinal edge, which is initially open before being sealed closed downstream of the dispenser. A further alternative is to prepare the container from a tube of plastic film material and form heat-seals only at the transverse top and bottom edges. An additional alternative is to employ a film web carrying a plurality of pre-formed partial containers, e.g., a series of partially-formed containers having one or more pre-formed heat-seals and which may be separable with pre-formed perforations. Such a film web and the method by which it is converted into foam-containing cushions are disclosed in the above-incorporated U.S. Pat. No. 6,550,229.

Regardless of the specific technique employed to form the containers, such containers may have any desired size and shape, and may be a bag or pouch, or simply a sheet of film placed in a box or other structure. In the latter case, i.e., 'foam-in-place' packaging, dispenser 24 may be incorporated in a "gun"-type hand-held dispensing device as disclosed, e.g., in U.S. Pat. Nos. 3,687,370 and 3,945,569.

Figure 3:
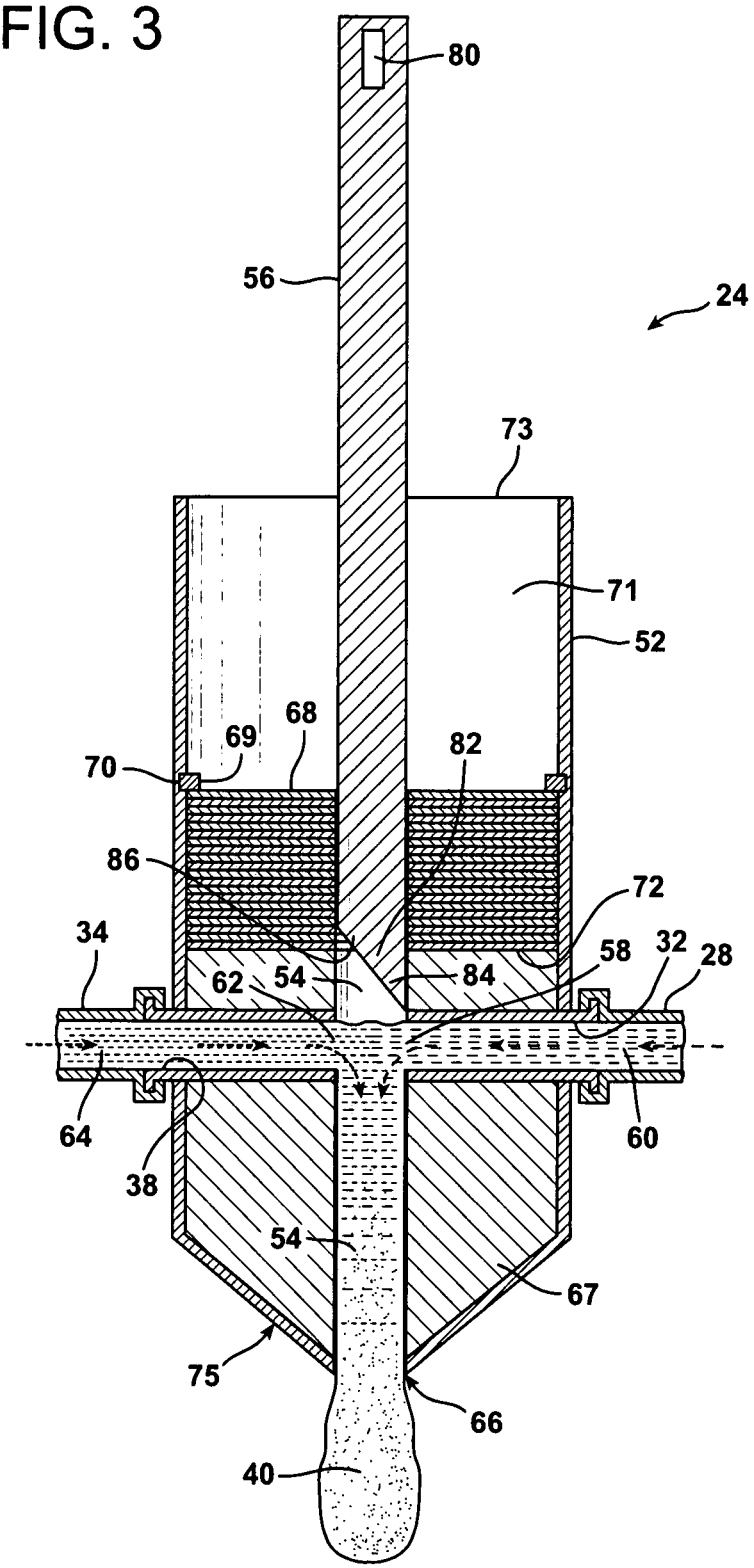
FIG. 3 is a cross-sectional view of one embodiment of the dispenser shown in FIG. 1, wherein the dispenser is in the 'open position'.
Figure 4:
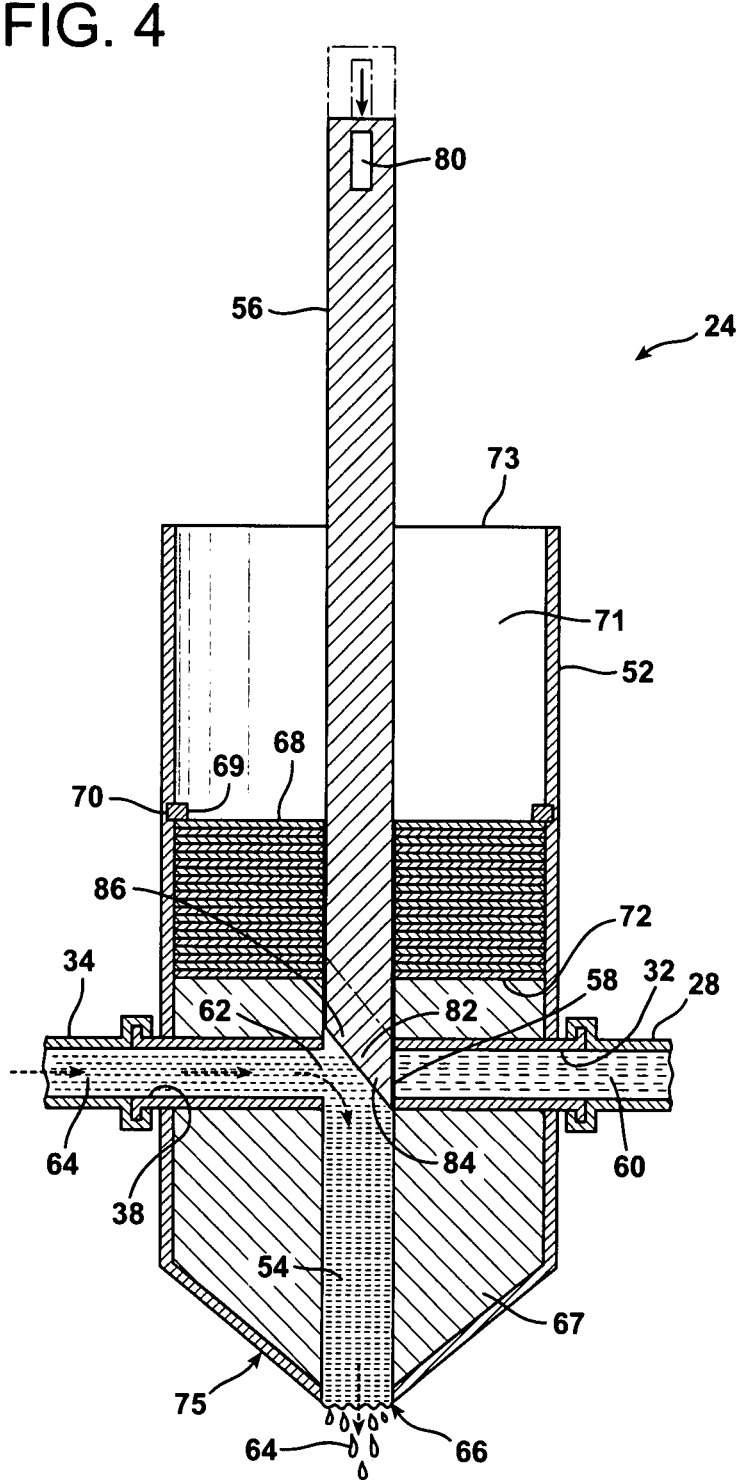
FIG. 4 is similar to FIG. 3, except that the dispenser is in the 'cleaning position'.
Figure 5:
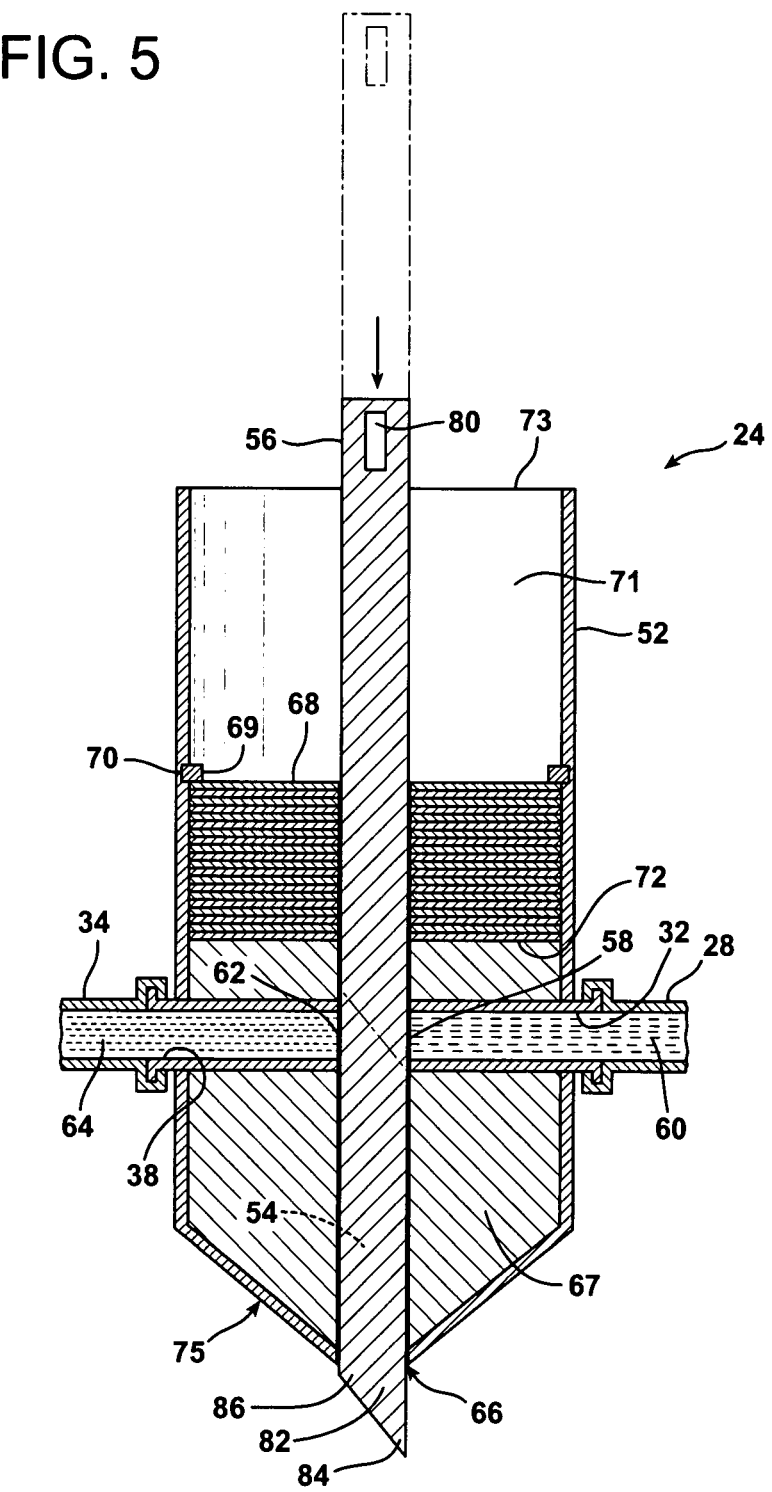
FIG. 5 is similar to FIG. 3, except that the dispenser is in the 'closed position'.

Referring now to FIGS. 3-5, one embodiment of dispenser 24 in accordance with the present invention will be described in further detail. As noted above, dispenser 24 is a device for mixing and dispensing fluids. Such device generally comprises a housing 52, a mixing chamber 54 in the housing, and a valving rod 56 received within mixing chamber 54.

Mixing chamber 54 includes a first inlet 58 for introducing a first fluid 60 into mixing chamber 54, a second inlet 62 for introducing a second fluid 64 into mixing chamber 54, and an outlet 66 through which fluid may exit the mixing chamber. In this embodiment, first inlet 58 is in fluid communication with first inlet port 32, which is coupled to conduit 28 to deliver first fluid 60 to mixing chamber 54, e.g., from first fluid source 30 (FIG. 1). Similarly, second inlet 62 is in fluid communication with second inlet port 38 to deliver second fluid 64 to mixing chamber 54, e.g., from second fluid source 36, via conduit 34. Additional inlet ports and inlets may be included as necessary, e.g., to mix three or more fluids in the mixing chamber 54.

Valving rod 56 is received within mixing chamber 54 and movable between:

(1) an open position, as shown in FIG. 3;
(2) a cleaning position, as shown in FIG. 4; and
(3) a closed position, as shown in FIG. 5.

When the valving rod 56 is in the open position (FIG. 3), the first and second inlets 58, 62 are each in fluid communication with mixing chamber 54 such that the first and second fluids 60, 64 may enter the mixing chamber as shown, form a fluid mixture 40 therein, and exit the mixing chamber via outlet 66.

When valving rod 56 is in the cleaning position (FIG. 4), the valving rod substantially seals closed the first inlet 58 to substantially prevent the first fluid 60 from entering mixing chamber 54. Significantly, when the valving rod 56 is in the cleaning position, it does not seal closed the second inlet 62. In this manner, the second fluid 64 may continue to enter the mixing chamber as shown. This allows the second fluid 64 to act as a cleaning or flushing agent for the mixing chamber 54, which may be particularly advantageous when first fluid 60 and/or mixture 40 adhere to the internal surface(s) of the mixing chamber 54.

When valving rod 56 is in the closed position (FIG. 5), the valving rod substantially seals closed both the first and second inlets 58, 62 to substantially prevent the first and second fluids 60, 64 from entering the mixing chamber 54 as shown.

Valving rod 56 may be moved between the open, cleaning, and closed positions by any suitable mechanism, e.g., via an actuating mechanism 74 as shown in phantom in FIGS. 1-2, which includes an actuator 76 and drive arm 78. Actuator 76 may be powered electrically, pneumatically, or otherwise, and causes drive arm 78 to reciprocate both toward and away from dispenser 24. Drive arm 78 may, in turn, be mechanically connected to valving rod 56, e.g., via slot 80. In this fashion, when drive arm 78 reciprocates away from dispenser 24, valving rod 56 assumes the open position shown in FIG. 3. Further reciprocation of the drive arm 78 toward the dispenser will move the valving rod 56 to an intermediate, cleaning position (FIG. 4) and then, upon further movement toward the dispenser, to the closed position shown in FIG. 5.

When dispenser 24 is used for foam-in-place or foam-in-bag packaging has described hereinabove, first fluid 60 may comprise one or more isocyanates and second fluid 64 may comprise one or more polyols. In this manner, when valving rod 56 is in the open position as shown in FIG. 3, the isocyanates and polyols form a foamable fluid mixture 40 in mixing chamber 54. The fluid mixture 40 flows through the mixing chamber 54 and exits the chamber at outlet 66, whereupon it may be directed into a partially-formed flexible container 22 as shown in FIG. 1.

Dispenser 24 may further include additional internal components as conventionally employed in foam-in-place/foam-in-bag dispensers, e.g., as described in the above-incorporated U.S. Pat. Nos. 6,929,193 and 6,996,956.

Thus, for example, the mixing chamber 54 may be defined within housing 52 by a mixing unit 67, which may be an integral or, as shown, distinct component of the housing 52. When used in dispenser 24, mixing unit 67 includes a pair of lateral openings to accommodate first and second inlet ports 32, 38 as shown. In many applications, the valving rod 56 and mixing unit 67 may be sized such that the valving rod fits relatively tightly in the mixing chamber 54, i.e., the outside diameter of the valving rod may be very close to, but only slightly larger than the inner diameter of the mixing chamber. The resultant close fit between the valving rod and mixing chamber may reduce the likelihood that fluids will leak from mixing chamber 54 and into the other parts of housing 52. Mixing unit 67 may be constructed, e.g., from TEFLON (i.e., tetrafluoroethylene (TFE) or fluorinated ethylene-propylene (FEP) polymers) or any other inert material which also allows a slidable 'friction fit' between it and the valving rod 56.

In the illustrated embodiments, valving rod 56 moves in a reciprocating fashion through housing 52 between the open, cleaning, and closed positions. Guide rings 68, e.g., a stack of washers, may be provided in housing 52 to assist in maintaining valving rod 56 in proper alignment during such movement. The guide rings 68 may be fitted into housing 52 such that they exert a compressive force on mixing unit 67. In some applications, such compression may help to prevent fluid leakage from the inlet ports 32 and/or 38 when the valving rod is positioned to block fluid flow through respective inlets 58 and/or 62, i.e., depending upon whether the valving rod is in the cleaning position (only first inlet 58 blocked) or the closed position (both inlets 58 and 62 blocked). To this end, guide rings 68 may comprise one or more spring washers, e.g., Bellville washers.

All of the internal components of housing 52, e.g., the mixing unit 67 and guide rings 68, may be held within housing unit 53 at a desired level of compression by retaining ring 69. Retaining ring 69 may be a snap ring, which is an expandable, outwardly biased ring that is held in place against the interior surface of the housing by placing such ring within a corresponding interior groove 70 as shown.

While the forward part 75 of housing 52 is shown with a tapered or conical shape, any desired shape may be employed to suit the particular application in which the dispenser is employed. Examples of suitable shapes include planar (flat), round, oval, trapezoidal, etc., including symmetrical and asymmetrical configurations.

As noted in the Background section above, as the dispenser 24 operates over and over again, particularly in automated or successive fashion, the foamable mixture 40 produced by mixing the first and second fluids 60, 64 has a tendency to build up in the mixing chamber 54 and around the outlet 66, harden into foam, and block the proper exiting of further foamable mixture in subsequent operation of the dispenser. The present invention provides an improved means for continually cleaning mixing chamber 54 and outlet 66 to prevent such build-up by periodically flushing the mixing chamber with second fluid 64 alone, i.e., without allowing first fluid 60 to also flow into the mixing chamber during the cleaning cycle. This technique has been found to be effective when first fluid 60 comprises one or more isocyanates and second fluid 64 comprises one or more polyols. That is, the 'polyol flush' provided by the exclusive flow of second fluid 64 through mixing chamber 54 was found to be sufficient to rinsingly remove most or all of the foamable fluid mixture 40 that remains in adherence with the internal surfaces of dispenser 24 that define the mixing chamber 54. This, in turn, substantially increases the service life of the dispenser without the need to pump a solvent from an external source and into the mixing chamber, as an integral part of each dispensing cycle, as is currently required.

One way to accomplish such cleaning flush by second fluid 64 is to shape valving rod 56 such that it seals closed first inlet 58 but does not seal closed second inlet 62 when the valving rod is in the cleaning position. As illustrated in FIGS. 3-5, the distal end 82 of the valving rod 56 may thus be formed with an extended portion 84 and a non-extended portion 86, wherein the extended portion 84 extends further toward outlet 66 than the non-extended portion 86. This configuration allows the valving rod 56 to be positioned relative to inlets 58, 62 such that the extended portion 84 blocks the flow of first fluid 60 into mixing chamber 54 by sealing closed first inlet 58 while, at the same time, allowing second fluid 64 to continue to flow into the mixing chamber by not sealing closed the second inlet 62. Thus, as shown perhaps most clearly in FIG. 4, when the valving rod is in the cleaning position, the non-extended portion 86 does not completely seal closed the second inlet 62 during the contemporaneous closure of first inlet 58 by extended portion 84.

After valving rod 56 moves from the open position to the cleaning position, the second fluid 64 may thus continue to flow through mixing chamber 54 and exit the chamber via outlet 66 as shown, taking with it some or all of the foamable fluid mixture 40 that may have remained in adherence with the walls of the mixing chamber from the previous cycle of mixing fluids 60, 64 and dispensing their mixture 40 into a container. The valving rod 56 may be maintained in the cleaning position for any desired length of time to achieve any desired amount of flush, i.e., quantity of second fluid 64 that flows through mixing chamber 54. The quantity of second fluid 64 used for the cleaning flush may be disposed of in any desired manner. Conveniently, the flush fluid 64 may be directed into the previously-filled flexible container 22 or in the next container to be filled with fluid 40. For foam-in-place packaging, the second/flush fluid 64 will become part of the foamable composition 40 and, therefore, part of the final foam itself. This is because the second/flush fluid 64 becomes a reactant in the foaming reaction taking place within the container. This is in stark contrast to the conventional use of a non-reactant cleaning solvent to flush the mixing chamber, which does not become part of the foam and is therefore free to flow out of any vent or seal holes in the container.

Alternatively, the flush fluid may be directed into a separate container designated to hold the flush fluid.

Distal end 82 may have an angled configuration as illustrated, or any shape with both extended and non-extended portions to allow the valving rod 56 to be positioned for simultaneous closure of the first inlet 58 but continued flow through the second inlet 62.

Figure 6:
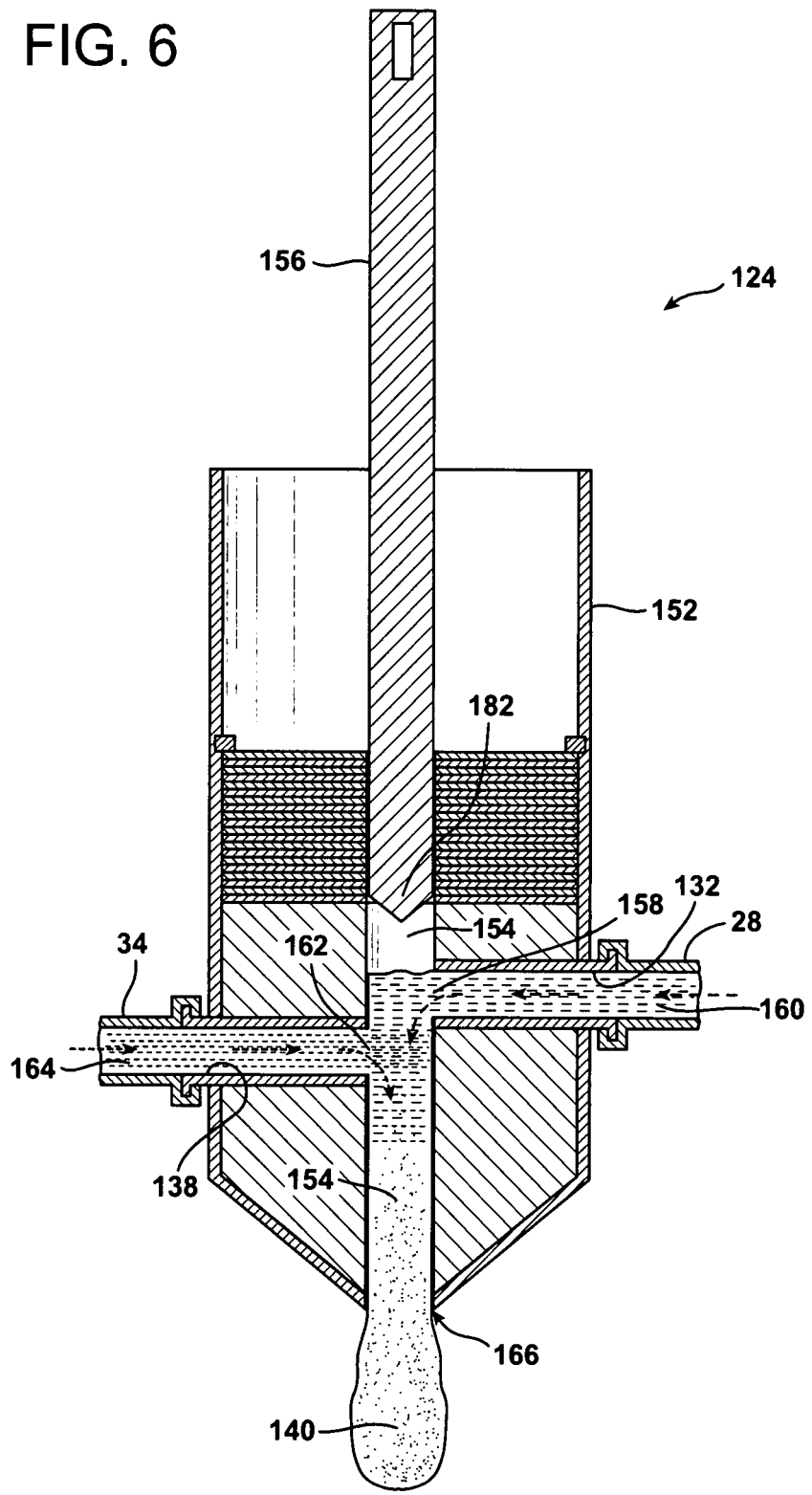
FIG. 6 is a cross-sectional view of another embodiment of the dispenser shown in FIG. 1, wherein the dispenser is in the 'open position'.
Figure 7:
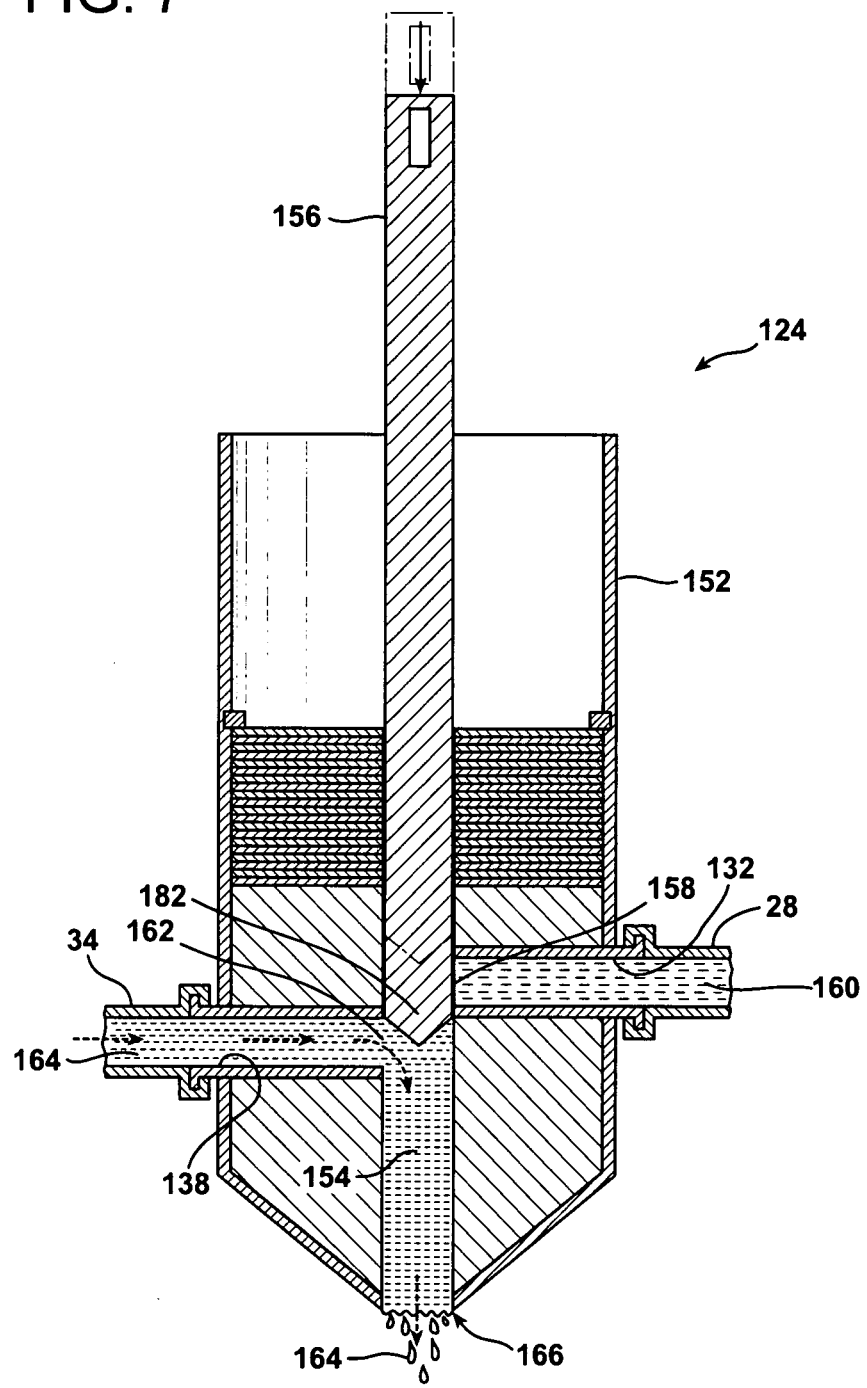
FIG. 7 is similar to FIG. 6, except that the dispenser is in the 'cleaning position'.
Figure 8:
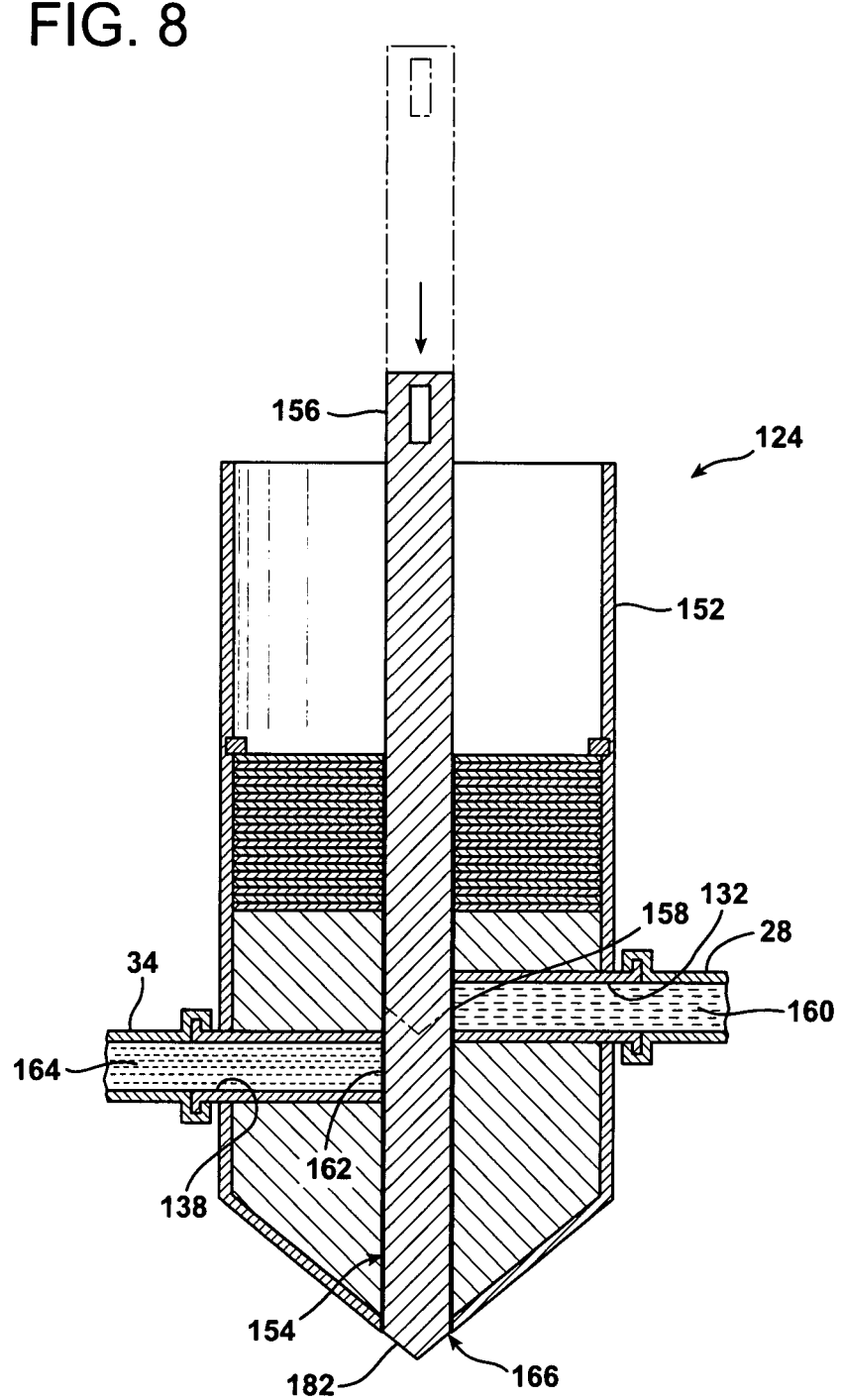
FIG. 8 is similar to FIG. 6, except that the dispenser is in the 'closed position'.

An alternative way to accomplish the exclusive flow of the second fluid through the mixing chamber is shown in FIGS. 6-8, wherein alternative dispenser 124 is illustrated. Like dispenser 24, dispenser 124 is a device for mixing and dispensing fluids, which generally includes a housing 152, a mixing chamber 154 in the housing, and a valving rod 156 received within mixing chamber 154.

Mixing chamber 154 includes a first inlet 158 for introducing a first fluid 160 into mixing chamber 154, a second inlet 162 for introducing a second fluid 164 into mixing chamber 154, and an outlet 166 through which fluid may exit the mixing chamber. First inlet 158 is in fluid communication with first inlet port 132, while second inlet 162 is in fluid communication with second inlet port 138. Thus, if dispenser 24 is supplanted with dispenser 124 in system 10 (FIGS. 1-2), first inlet port 132 would be coupled to conduit 28 to deliver first fluid 160 to mixing chamber 154 from first fluid source 30. Similarly, second inlet port 138 would be coupled to conduit 34 to deliver second fluid 164 to mixing chamber 154 from second fluid source 36.

Valving rod 156 is received within mixing chamber 154 and movable between:

(1) an open position, as shown in FIG. 6;
(2) a cleaning position, as shown in FIG. 7; and
(3) a closed position, as shown in FIG. 8.

When the valving rod 156 is in the open position (FIG. 6), the first and second inlets 158, 162 are each in fluid communication with mixing chamber 154 such that the first and second fluids 160, 164 may enter the mixing chamber as shown, form a fluid mixture 140 therein, and exit the mixing chamber via outlet 166.

When valving rod 156 is in the cleaning position (FIG. 7), the valving rod substantially seals closed the first inlet 158 to substantially prevent the first fluid 160 from entering mixing chamber 154 as shown. Significantly, when the valving rod 156 is in the cleaning position, it does not seal closed the second inlet 162. In this manner, the second fluid 164 may continue to enter the mixing chamber 154 as shown, in order to act as a cleaning or flushing agent for the mixing chamber 154 as described above.

When valving rod 156 is in the closed position (FIG. 8), the valving rod substantially seals closed both the first and second inlets 158, 162 to substantially prevent the first and second fluids 160, 164 from entering the mixing chamber 154 as shown.

In this embodiment, the cleaning flush provided by second fluid 164 may be effected by relatively positioning the first and second inlets 158, 162 such that the valving rod 156 seals closed first inlet 158 but does not seal closed second inlet 162 when valving rod 156 is in the cleaning position (FIG. 7). For example, second inlet 162 may be located closer to outlet 166 than first inlet 158 as shown. In other words, if the portion of dispenser 124 at which outlet 166 is located is considered the forward part of the dispenser, in this embodiment, second inlet 162 is more forwardly positioned than first inlet 158. In this manner, when valving rod 156 is moved forward from the open position shown in FIG. 6 to the cleaning position shown in FIG. 7, the more forward-positioned second inlet 162 remains open while the more rearward-positioned first inlet 158 is sealed closed by the valving rod. Upon further forward advancement of the valving rod 156 towards the outlet 166, e.g., to the closed position shown in FIG. 8, the second inlet 162 is sealed closed as well.

While the distal end 182 of valving rod 156 is shown as pointed, in this embodiment, the distal end 182 may have any desired shape, e.g., flat, concave, convex, curved, angular, etc.

Accordingly, it may be appreciated that the present invention provides a method for mixing fluids in a device 24, 124 comprising a mixing chamber 54, 154 having a first inlet 58, 158 for introducing a first fluid 60, 160 into the mixing chamber, a second inlet 62, 162 for introducing a second fluid 64, 164 into the mixing chamber, and an outlet 66, 166, with a valving rod 56, 156 movably received within the mixing chamber 54, 154. The method includes the steps of:

a. moving valving rod 56, 156 to an open position, in which the first 58, 158 and second 62, 162 inlets are in fluid communication with mixing chamber 54, 154 such that the first 60, 160 and second 64, 164 fluids enter the mixing chamber, form a mixture therein, and exit the mixing chamber via outlet 66, 166;

b. moving valving rod 56, 156 to a cleaning position, in which the valving rod (1) substantially seals closed first inlet 58, 158 to substantially prevent the first fluid 60, 160 from entering mixing chamber 54, 154, but (2) does not seal closed second inlet 62, 162 so that the second fluid 64, 164 continues to enter and flow through the mixing chamber 54, 154; and c. moving valving rod 56, 156 to a closed position, in which the valving rod substantially seals closed the first 58, 158 and second 62, 162 inlets to substantially prevent the first 60, 160 and second 64, 164 fluids from entering the mixing chamber 54, 154.

If desired, the features of dispenser 24 may be combined with those of dispenser 124 so that the resultant dispenser has, e.g., both a specially-shaped valving rod and first and second inlets that are off-set relative to one another.

In dispenser 24, 124, or in other embodiments of a device for mixing and dispensing fluids in accordance with the present invention, the valving rod 56, 156 may be moved continuously or non-continuously between the open, cleaning, and closed positions. For example, valving rod 56, 156 could be moved in a continuous forward motion from the open position, through the cleaning position, and then to the closed position, at a speed which achieves a desired dispensation of fluid mixture 40, 140 and flush of second fluid 64, 164. At the appropriate time, i.e., after a pause in the closed position or after no pause in the closed position, depending, e.g., on the speed at which severing/sealing mechanism 44 and/or conveying mechanism 12 operates (FIGS. 1-2), the valving rod could then be moved in a continuous rearward motion from the closed position, through the cleaning position, i.e., for a second flush of the second fluid 64, 164 after the preceding dispensation of fluid mixture 40, 140, and then to the open position to dispense a desired quantity of fluid mixture into the next container 22 to be filled.

Alternatively, the valving rod could be moved non-continuously in the forward and/or rearward direction. Thus, after a desired quantity of fluid mixture is dispensed while the valving rod is in the open position, it can be moved forward to the cleaning position and halted there for a desired period of time to produce a desired flush of the second fluid, i.e., a desired amount of flow of only the second fluid through the mixing chamber. Thereafter, the forward motion of the valving rod could be resumed until the valving rod arrives at the closed position. Alternatively, before or after arriving at the closed position, the valving rod could be returned to the cleaning position one or more times, e.g., in a stutter-like motion, to achieve one or more additional "flush-flow bursts" of the second fluid.

The foregoing continuous or non-continuous movement of the valving rod may be effected, e.g., by appropriate control of actuating mechanism 74. Such control may be manual; pre-programmed, e.g., via a programmable logic controller or other device that allows pre-set commands to be programmed; fully programmable, e.g., via a central processing unit; etc.

The foregoing description of dispenser 24 and dispenser 124 illustrates two different ways of stopping the supply of the first fluid but continuing to supply the second fluid to the dispenser so that the second fluid continues to enter the mixing chamber and exit the chamber via the outlet thereof. As may be appreciated, however, there are other ways to accomplish the resultant cleaning flush by the second fluid. For example, after a desired quantity of fluid mixture 40 is dispensed, the valving rod could be left in the open position and the pump 29 for first fluid 60, 160 can simply be turned off while pump 36 for second fluid 64, 164 remains operating. When this occurs, the supply of the first fluid through the mixing chamber will be stopped while the second fluid will continue to flow through, and thereby effect a cleansing flush of, the mixing chamber. This operational technique may be used in conjunction with, or as an alternative to, dispenser 24 and/or dispenser 124.

Although the present invention obviates the need to continuously supply a cleaning solvent to the mixing chamber between each dispensing cycle, it may, in some applications, be beneficial to include a quantity of solvent in the housing in order to prevent the first and second fluids, their mixture, or other derivatives thereof (e.g., residues of such fluids) from building up on the sides of the valving rod, e.g., due to contact between the valving rod and such fluids as the valving rod moves through the mixing chamber. With reference to FIGS. 1-3 and dispenser 24, housing 52 may thus include an internal reservoir 71 to the rear of the mixing unit 67, in which a discrete quantity of cleaning solvent may be contained. Such reservoir 71 may include substantially all of the available volume inside of housing 52, e.g., from the rear 72 of mixing unit 67 to the rear 73 of housing 52, including any void space among the guide rings 68. The rear 73 may include a suitable closure (not shown), e.g., a sealing ring, in order to seal the solvent within the reservoir 71. In this manner, as the valving rod 56 reciprocates through the housing, at least a part of the valving rod will move through the reservoir 71 so that the solvent retained therein can dissolve all or part of any fluid or fluid residue that may be in adherence with the surface of the valving rod.

Any suitable cleaning solvent may be used in which the fluids 60, 64, fluid mixture 40, and/or derivatives thereof, are at least partially soluble. Where the dispenser 24 is used to produce foam-in-place or foam-in-bag packaging cushions, the solvent employed is preferably capable of at least partially dissolving both the polyol and isocyanate foam precursors, as well as the foamable composition and polyurethane foam reaction-products produced by their mixture. Suitable cleaning solvents for this purpose may be selected from, e.g., alcohols; glycols; ethers, such as ethylene and propylene glycol ethers; esters; ethoxylates, such as alkyl alcohol ethoxylates, alkyl phenol ethoxylates, alkyl phenol alkoxylates; etc.

Figure 9:
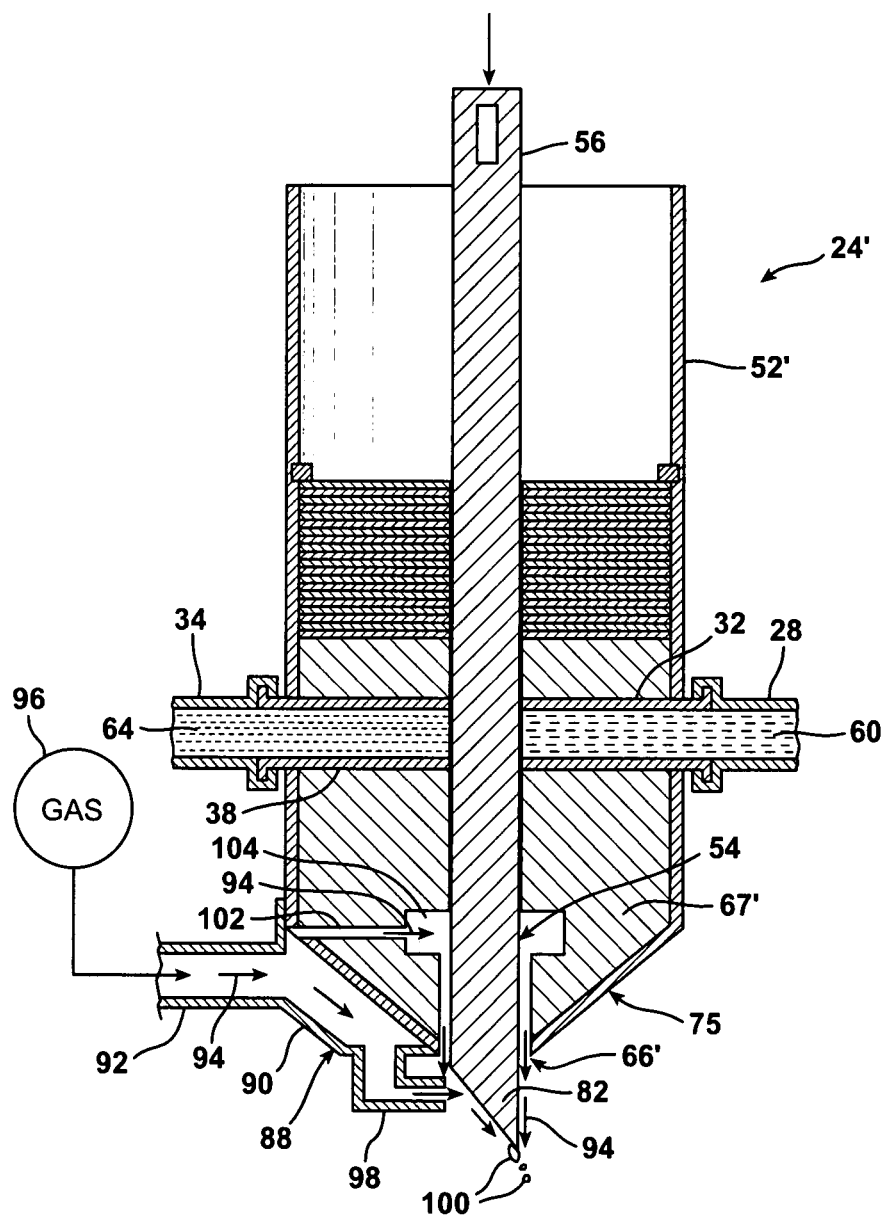
FIG. 9 is similar to FIG. 5, with an optional apparatus for directing fluid against the distal end of the valving rod.

In some embodiments, it may be propitious to provide a mechanism for continuously or periodically removing at least a portion of any fluids, e.g., first fluid 60 and/or second fluid 64, or derivatives thereof, i.e., reaction products, e.g., mixture 40, 140, and residues of such fluids, that may be in adherence with the distal end 82, 182 of the valving rod 56, 156 and/or with outlet 66, 166. Such mechanism may comprise an apparatus 88 for directing a third fluid, e.g., a gas such as air, against the distal end 82, 182 and/or the outlet 66, 166, including the surface(s) of housing 52, 152 that surround the outlet. Apparatus 88 is illustrated in FIG. 9, as an 'add-on' component to dispenser 24. The dispenser as modified by the addition of apparatus 88 thereto is thus designated by the reference number 24', but may otherwise be substantially the same as described above in connection with dispenser 24, except as otherwise noted.

Dispenser 24' is illustrated with valving rod 56 in the closed position such that neither the first 60 nor second fluid 64 flows into/through mixing chamber 54. Fluid-directing apparatus 88 may be attached to the forward part 75 of housing 52', and may include a plenum 90 with an inlet 92 for receiving a third fluid 94, such as air or other gas (e.g., $CO_2$, $N_2$, etc.) from a source 96 as shown. Gas source 96 may be any suitable means for supplying gas, such as a blower, compressor, compressed-gas cylinder, etc. Alternatively, source 96 may be one that supplies a liquid to apparatus 88.

The apparatus 88 may further include an exit channel 98 for directing the fluid 94 against the distal end 82 of valving rod 56 as shown. In this manner, the fluid 94 removes at least a portion of any fluids or derivatives thereof that may be in adherence with distal end 82 of valving rod 56, e.g., as dislodged droplets 100 that are blown off of the distal end 82 as shown. In some embodiments, exit channel 98 may be configured to also direct fluid 94 against outlet 66'.

The flow of third fluid 94 may be qualitatively and/or quantitatively controlled as desired to suit the end-use application of dispenser 24', i.e., to achieve a desired degree of fluid removal from distal end 82 and/or outlet 66'. Thus, for example, the third fluid 94 may be directed against the distal end in either a continuous or an intermittent manner, e.g., only when the valving rod is in the closed position. During the time when the third fluid 94 is being directed against the distal end 82 and/or outlet 66', the flow of the third fluid 94 may be continuous or pulsed. The volumetric flow rate and velocity of the third fluid 94 may also be suitably established based on, e.g., the shape and size of exit channel 98, flow rate and pressure from fluid source 96, internal volume of plenum 90, etc. The velocity of fluid 94 against distal end 82 may, for example, be sub-sonic, super-sonic, or both (e.g., oscillating between sub-sonic and super-sonic velocity).

Numerous variations are possible. For example, apparatus 88 may include a second exit channel 102, which may direct fluid 94, or other fluid from another fluid source, to an annular cavity 104 in housing 52', e.g., in mixing unit 67'. Annular cavity 104 may be positioned towards the forward end 75 of housing 52', so that fluid 94 may, as shown, flow axially along the distal end 82 of the valving rod and exit the housing 52' at outlet 66'. As a further variation, plenum 90 could extend around substantially the entire forward end 75 of housing 52' in an annular fashion, with multiple exit channels 98, or with a single, continuous exit channel, to direct fluid 94 radially inward along substantially the entire forward end 75, converging at outlet 66' and distal end 82.

Figure 10:
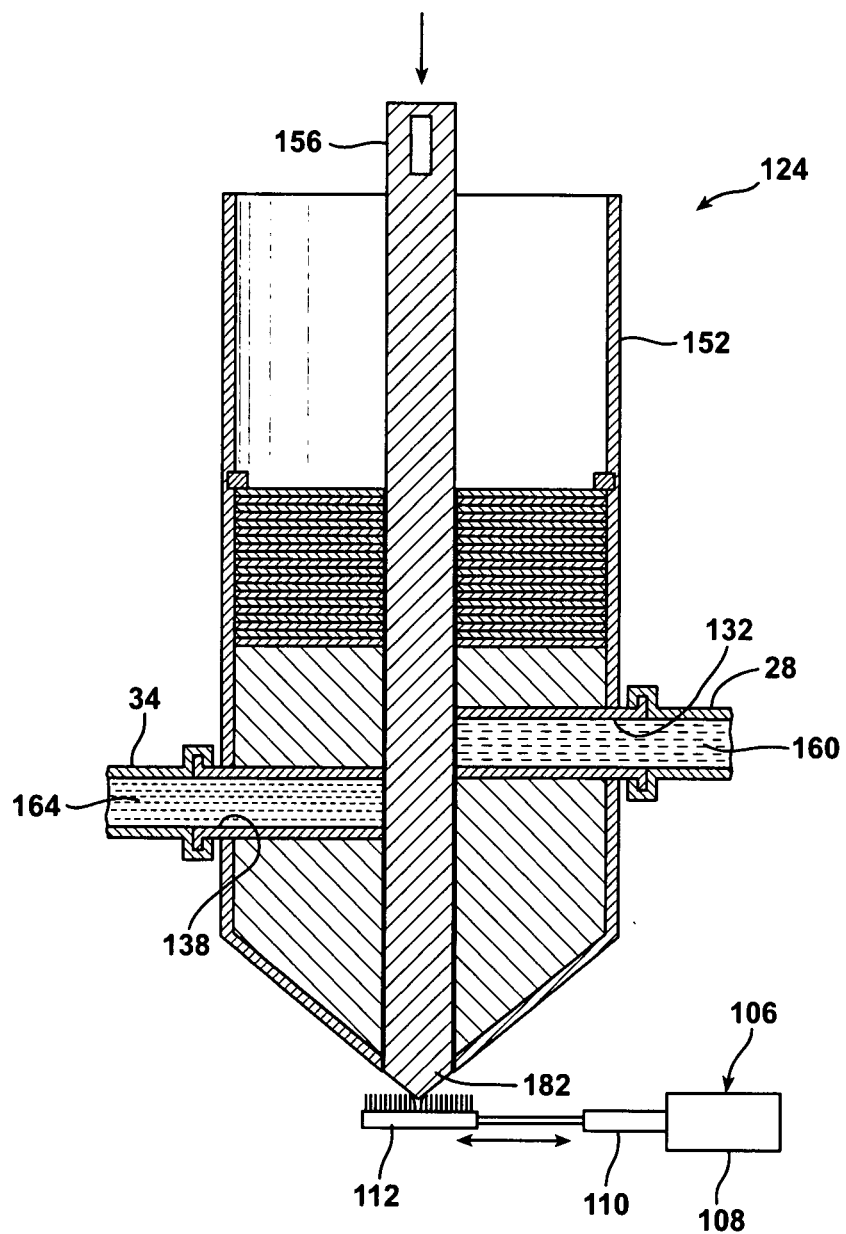
FIG. 10 is similar to FIG. 8, but including a schematic illustration of an optional apparatus for physically contacting the distal end of the valving rod.

An alternative mechanism for removing at least a portion of any fluids or derivatives thereof that may be in adherence with distal end 82 is shown in FIG. 10, wherein an apparatus 106 for physically contacting distal end 182 of valving rod 156 is schematically illustrated in combination with dispenser 124. Apparatus 106 may include an actuator 108, drive arm 110, and contact member 112, e.g., a brush-like or wiper-like device. Apparatus 106 may be fixed in the position shown, or movable into such position as desired, e.g., based on manual or automated commands. When valving rod 156 is in the closed position as shown, actuator 108 may be activated to cause contact member 112 to reciprocate and/or rotate in contact with distal end 182 of the valving rod as shown, thereby physically removing at least a portion of any fluids or derivatives thereof that may be in adherence with such distal end. If desired, contact member 112 may be made larger, or additional contact members may be included, to also contact the surface(s) of housing 152 that surround exit 166. Numerous other means for physically contacting the distal end of the valving rod are, of course, possible, e.g., abrasive contact with the distal end of the valving rod and/or housing as disclosed in U.S. Pat. No. 6,283,174, the disclosure of which is hereby incorporated herein by reference thereto.

Although apparatus 106 is illustrated in use with dispenser 124, it could similarly be used in combination with dispenser 24 or with any other dispenser in accordance with the present invention. Similarly, apparatus 88 could be used with dispenser 124 or with any dispenser in accordance with the invention.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A device for mixing and dispensing fluids, comprising:
   a. a housing;
   b. a mixing chamber in said housing, said mixing chamber comprising
      (1) a first inlet for introducing a first fluid into said mixing chamber,
      (2) a second inlet for introducing a second fluid into said mixing chamber, and
      (3) an outlet through which fluid may exit said mixing chamber;
   and
   c. a valving rod received within said mixing chamber and movable between
      (1) an open position, in which said first and second inlets are in fluid communication with said mixing chamber such that the first and second fluids may enter said mixing chamber, form a mixture therein, and exit said mixing chamber via said outlet,
      (2) a cleaning position, in which said valving rod substantially seals closed said first inlet to substantially prevent the first fluid from entering said mixing chamber, but does not seal closed and flow through said mixing chamber, whereby said second fluid acts as a cleaning agent for said mixing chamber, and
      (3) a closed position, in which said valving rod substantially seals closed said first and second inlets to substantially prevent the first and second fluids from entering said mixing chamber.

2. The device of claim 1, wherein said valving rod is shaped such that it seals closed said first inlet and does not seal closed said second inlet when said valving rod is in said cleaning position.

3. The device of claim 2, wherein said valving rod has a distal end with an extended portion and a non-extended portion, said extended portion extending further toward said outlet than said non-extended portion.

4. The device of claim 1, wherein said first and second inlets are relatively positioned such that said valving rod seals closed said first inlet and does not seal closed said second inlet when said valving rod is in said cleaning position.

5. The device of claim 4, wherein said second inlet is located closer to said outlet than said first inlet.

6. The device of claim 1, wherein
   said valving rod has a distal end; and
   said device further includes a mechanism to remove at least a portion of any fluids or derivatives thereof that may be in adherence with said distal end or said outlet.

7. The device of claim 6, wherein said mechanism comprises an apparatus for directing a third fluid against said distal end.

8. The device of claim 1, wherein said valving rod is adapted to be moved continuously between said open, cleaning, and closed positions.

9. The device of claim 1, wherein said valving rod is adapted to be moved non-continuously between said open, cleaning, and closed positions.

* * * * *